(12) United States Patent
Sun et al.

(10) Patent No.: US 12,493,195 B1
(45) Date of Patent: Dec. 9, 2025

(54) PROJECTOR AND SENSING SYSTEM USED THEREFOR

(71) Applicant: HTC Corporation, Taoyuan (TW)

(72) Inventors: Shih Hong Sun, Taoyuan (TW); Chih Pin Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/950,171

(22) Filed: Nov. 18, 2024

(51) Int. Cl.
*G03B 21/20* (2006.01)
*G02B 27/42* (2006.01)
*H04N 13/254* (2018.01)

(52) U.S. Cl.
CPC ......... *G02B 27/425* (2013.01); *H04N 13/254* (2018.05)

(58) Field of Classification Search
CPC ....... G02B 27/425; G02B 5/30; H04N 13/254
See application file for complete search history.

(56) References Cited

U.S. PATENT DOCUMENTS

| 10,969,668 | B2 * | 4/2021 | Ma | G03B 21/00 |
| 2009/0147365 | A1 * | 6/2009 | Inokuma | G02B 3/005 |
| | | | | 359/599 |
| 2019/0137856 | A1 * | 5/2019 | Na | G01B 11/2509 |
| 2019/0281263 | A1 * | 9/2019 | Minami | G06T 7/521 |
| 2019/0331972 | A1 * | 10/2019 | Nimura | H10D 30/6723 |
| 2020/0128217 | A1 * | 4/2020 | Minami | H04N 9/3185 |
| 2020/0319474 | A1 * | 10/2020 | Ma | G02B 5/3083 |
| 2023/0066382 | A1 * | 3/2023 | Ito | G03B 21/2053 |

FOREIGN PATENT DOCUMENTS

| TW | I657264 | 4/2019 |
| TW | I746169 | 11/2021 |
| TW | I791148 | 2/2023 |

OTHER PUBLICATIONS

"Office Action of Taiwan Counterpart Application", issued on Jul. 28, 2025, p. 1-p. 10.

* cited by examiner

*Primary Examiner* — Howard D Brown, Jr.
(74) *Attorney, Agent, or Firm* — JCIPRNET

(57) ABSTRACT

A projector includes a light source and a diffractive optical element. The light source has a first light emitting area and a second light emitting area. The diffractive optical element is disposed on the light source. The diffractive optical element has a first diffraction structure and a second diffraction structure respectively overlapped with the first light emitting area and the second light emitting area, and the first diffraction structure is different from the second diffraction structure. A sensing system is also provided.

18 Claims, 8 Drawing Sheets

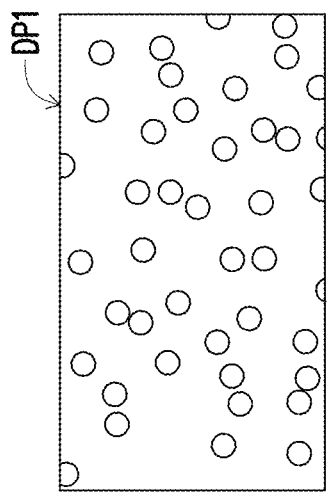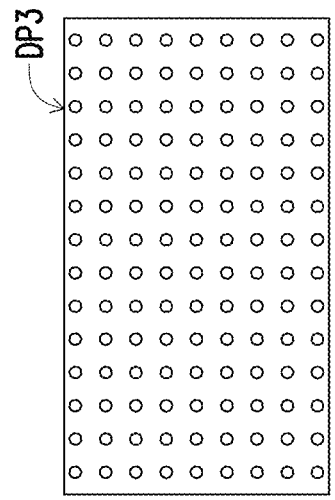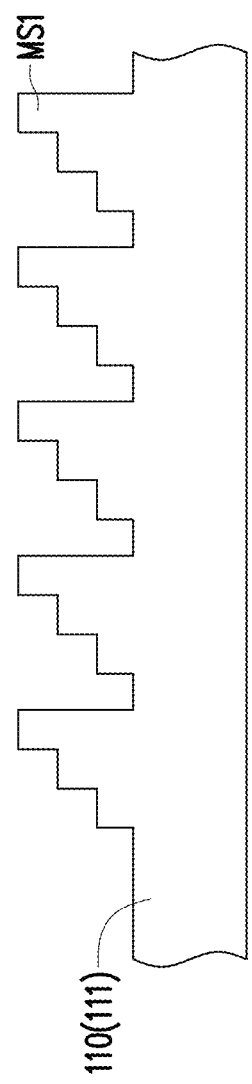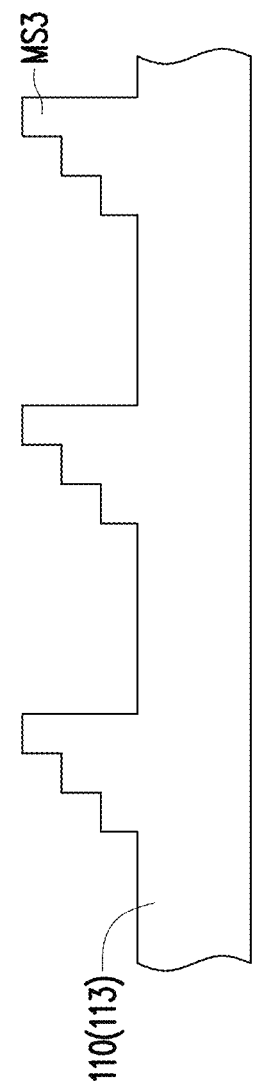
FIG. 2A
FIG. 2B

PROJECTOR AND SENSING SYSTEM USED THEREFOR

BACKGROUND

Technical Field

The disclosure relates to an electronic device, and particularly relates to a projector and a sensing system used therefor.

Description of Related Art

With the development of technology, the positioning function of electronic products for environmental objects or users is becoming increasingly important (such as augmented reality (AR), virtual reality (VR), and mixed reality (MR) to track the user's hand position, smart home appliances or three-dimensional information of test objects in autonomous driving sensing environments, etc.). However, as the market demand for electronic product applications continues to expand, it becomes increasingly challenging to further reduce the weight, volume and cost of existing sensing systems for integration into various electronic products (such as head-mounted displays or handheld mobile devices, etc.). How to solve the above problems still needs to be overcome by relevant manufacturers.

SUMMARY

The disclosure provides a projector, which may reduce the cost and the volume and weight of the device, and the projector has good versatility.

The disclosure provides a sensing system that may reduce the number of projectors used and further reduce the cost and the volume and weight of the device. In addition to improving the sensing effect, it may also improve the versatility of the sensing system and reduce the computational burden of the sensing system.

A projector according to an embodiment of the disclosure includes a light source and a diffractive optical element. The light source has a first light emitting area and a second light emitting area. The diffractive optical element is disposed on the light source. The diffractive optical element has a first diffraction structure and a second diffraction structure respectively overlapped with the first light emitting area and the second light emitting area, and the first diffraction structure is different from the second diffraction structure.

A sensing system according to an embodiment of the disclosure includes a light source, a diffractive optical element, and a camera. The light source has a first light emitting area and a second light emitting area. The diffractive optical element is disposed on the light source. The diffractive optical element has a first diffraction structure and a second diffraction structure respectively overlapped with the first light emitting area and the second light emitting area, and the first diffraction structure is different from the second diffraction structure. The camera is used to receive the light beam reflected by the test object.

Based on the above, in the projector and sensing system of the disclosure, the diffractive optical element (DOE) includes optical diffraction structures of different patterns. When light beams emitted by the same light source pass through the optical diffraction structures of different patterns, different diffraction patterns may be generated. Different diffraction patterns may be suitable for sensing different distances. Therefore, the disclosure may generate a variety of diffraction patterns with a single projector. Compared with an architecture in which a plurality of projectors generate a plurality of diffraction patterns, the disclosure may effectively reduce costs and conserve device space; further, customized optical diffraction structures may be tailored for different sensing distances (for example, the test object is the user's face or fingers, the test object is the environment around the user, the test object is the space where the user is, etc.), which may greatly improve the modeling accuracy of the sensing system.

Furthermore, when projectors or sensing systems are used in near-eye display devices (such as augmented reality (AR), virtual reality (VR), and mixed reality (MR)) to perform triangulation positioning and depth calculations, the center position of the device is where the two cameras have the highest coverage, and therefore usually covers the most optical elements. If the projector is split into a plurality of units, it will affect the coverage of the camera's depth calculation and greatly increase the amount of calculations required by the solid-state processor (central processing unit, CPU) in the sensing system. On the contrary, since the projector or sensing system of the disclosure may generate various diffraction patterns with a single projector, it may be applied to various sensing spaces and may achieve the optimal spatial coverage, which improves the performance of near-eye display devices, facilitates lightweighting, and greatly improves the competitiveness of products.

In order to make the above-mentioned features and advantages of the disclosure clearer and easier to understand, the following embodiments are given and described in details with accompanying drawings as follows.

BRIEF DESCRIPTION OF THE DRAWINGS

FIG. 2A to FIG. 2C are schematic diagrams of a diffractive optical element and its corresponding generated diffraction pattern according to an embodiment of the disclosure.

DESCRIPTION OF THE EMBODIMENTS

Figure 1:
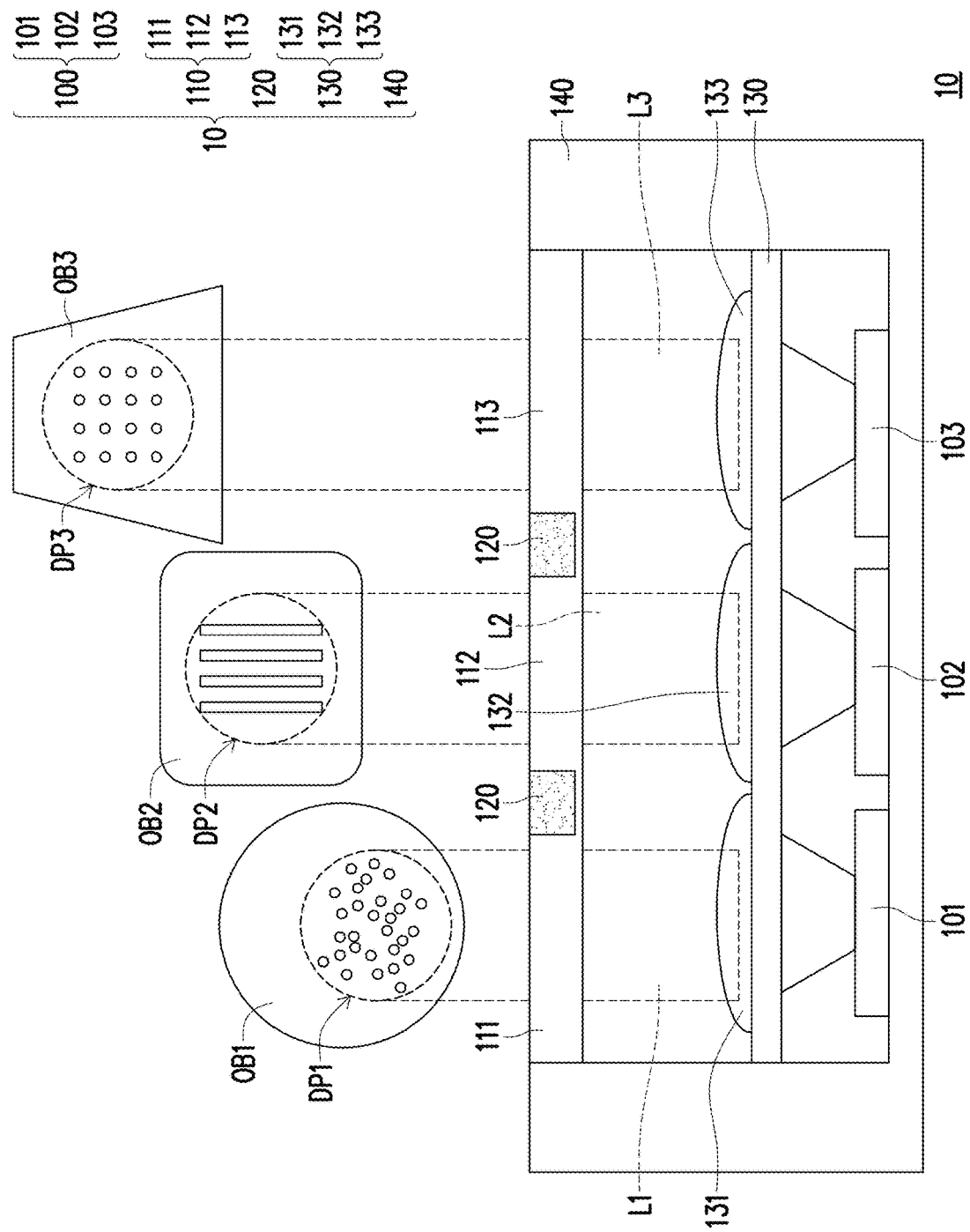
FIG. 1 is a schematic structural diagram of a projector and a schematic diagram of a diffraction pattern generated by the projector according to an embodiment of the disclosure.

The term "about," "approximately," "essentially," or "substantially" as used herein is inclusive of the stated value and means within an acceptable range of deviation for the particular value as determined by people having ordinary skill in the art, considering the measurement in question and the error associated with the measurement of the particular quantity (i.e., the limitations of the measurement system). For example, "about" may mean within one or more standard deviations, for example, within +30%, +20%, +15%, +10%, +5% of the sated value. Furthermore, a relatively acceptable range of deviation or standard deviation may be chosen for the terms "about," "approximately," "essentially," or "substantially" as used herein based on measuring properties, cutting properties or other properties, instead of applying one standard deviation across all the properties.

In the drawings, the thicknesses of layers, films, panels, regions, etc., are exaggerated for clarity. It should be understood that when an element such as a layer, film, region, or substrate is referred to as being "on" or "connected to" another element, it may be directly on or connected to another element, or intervening elements may also be present. In contrast, when an element is referred to as being "directly on" or "directly connected to" another element, no intervening elements are present. As used herein, "connected" may refer to physical connection and/or electrical connection. Furthermore, "electrical connection" may mean the presence of other elements between two elements.

Reference will now be made in detail to the present preferred embodiments of the disclosure, examples of which are illustrated in the accompanying drawings. Whenever possible, the same reference numbers are used in the drawings and description to refer to the same or like parts.

FIG. 1 is a schematic structural diagram of a projector and a schematic diagram of a diffraction pattern generated by the projector according to an embodiment of the disclosure. Referring to FIG. 1, a projector 10 includes a light source 100, a diffractive optical element 110, a light blocking layer 120, a lens array 130, and a frame 140. The light source 100 may include a first light emitting area 101, a second light emitting area 102, and a third light emitting area 103. However, the disclosure is not limited thereto. In other embodiments, the light source 100 may include at least two light emitting areas, such as the first light emitting area 101 and the second light emitting area 102. The light source 100 is used to provide a light beam. For example, the first light emitting area 101, the second light emitting area 102, and the third light emitting area 103 may respectively emit a first light beam L1, a second light beam L2, and a third light beam L3 in the same wavelength range or different wavelength ranges. The wavelength range of the first light beam L1, the second light beam L2, and the third light beam L3 may include the visible light band (for example, the wavelength is between 380 nm and 750 nm) or the infrared light band (for example, the near infrared wavelength is 750 nm or more or 1054 nm or more), and the disclosure is not limited thereto.

The light source 100 may comprise various types of light sources, such as a light emitting diode (LED), a laser diode (LD), or a vertical-cavity surface-emitting laser (VCSEL), etc. Further, the light source 100 may include at least one of a point-like vertical-cavity surface-emitting laser, a linear vertical-cavity surface-emitting laser, an edge-emitting laser, and a random point vertical-cavity surface-emitting laser. However, the disclosure is not limited thereto. For example, in the embodiment, the light source 100 may be a VCSEL, and the structures of the first light emitting area 101, the second light emitting area 102, and the third light emitting area 103 may be made by epitaxy of different blocks of VCSEL in the semiconductor process. However, the disclosure is not limited thereto.

The diffractive optical element 110 is disposed on light source 100. Specifically, the diffractive optical element 110 is disposed in the light emitting direction of the light source 100. The diffractive optical element (DOE) 110 is an optical element that uses a semiconductor process to generate microstructures on the surface that diffract light beams. When the first light beam L1, the second light beam L2, and the third light beam L3 are irradiated onto the diffractive optical element 110, the required diffraction pattern or structured light may be generated at a specific position or space due to the diffraction effect of the microstructure. The diffraction pattern may be one-dimensional lines, one-dimensional point-like light spots, two-dimensional randomly distributed light spots, or two-dimensional regularly arranged light spots, and the disclosure is not limited thereto.

It is worth mentioning that in the embodiment, the diffractive optical element 110 also has a first diffraction structure 111, a second diffraction structure 112, and a third diffraction structure 113, which are respectively overlapped with the first light emitting area 101, the second light emitting area 102, and the third light emitting area 103. The first diffraction structure 111 is different from the second diffraction structure 112.

Since the first diffraction structure 111 and the second diffraction structure 112 may have different surface microstructures, when the first light beam L1 and the second light beam L2 pass through the first diffraction structure 111 and the second diffraction structure 112 respectively, different diffraction patterns may be generated. For example, the first light beam L1 emitted from the first light emitting area 101 may generate a first diffraction pattern DP1 after passing through the first diffraction structure 111, and the second light beam L2 emitted from the second light emitting area 102 may generate a second diffraction pattern DP2 after passing through the second diffraction structure 112. Furthermore, the first diffraction pattern DP1 may include a plurality of high-density point-like light spots, and the second diffraction pattern DP2 may include a plurality of striped light spots (as shown in FIG. 1) or a plurality of lower-density point-like light spots (not shown).

In the sensing field, in order to sense three-dimensional information of objects at different distances, for example, structured light technology may be used to emit light beams with specific diffraction patterns from the projector 10 to objects at different distances, then the diffraction pattern on the object surface is received through the stereo depth camera to compare the difference with the original projected light spot, or to compare the left and right camera images, and using the principle of triangulation, the three-dimensional coordinates or surface profile of the object may be calculated. For example, the first diffraction pattern DP1 may be a plurality of high-density point-like light spots with a small field of view (FOV), which is suitable for sensing the three-dimensional spatial information (such as surface profile, depth, or three-dimensional coordinates) of a first test object OB1 at a close distance, such as the user's finger position, hand movement, eye tracking, etc. The second diffraction pattern DP2 may be a plurality of striped light spots with a wider field of view (FOV), which is suitable for sensing three-dimensional spatial information (such as surface profile or three-dimensional coordinates) of a second test object OB2 at a medium distance, such as furniture or obstacles around the user. Therefore, a single projector 10 may tailor the required diffraction pattern for the sensing distance of a specific test object. When sensing different objects and test objects at different distances, the versatility and modeling accuracy of the projector 10 are greatly improved. Compared with the implementation of using different projectors to provide different diffraction patterns, the projector 10 also further simplifies the device structure and achieves lightweight of the device, which may effectively enhance the competitiveness of the product when applied to wearable devices.

Further, the diffractive optical element 110 further includes the third diffraction structure 113 overlapped with the third light emitting area 103. The first diffraction structure 111, the second diffraction structure 112, and the third diffraction structure 113 may be different from each other. For example, a third diffraction pattern DP3 formed after the third light beam L3 passes through the third diffraction structure 113 may be different from the first diffraction pattern DP1 and the second diffraction pattern DP2. For example, the third diffraction pattern DP3 includes a plurality of point-like light spots, and the density of the plurality of point-like light spots of the third diffraction pattern DP3 may be smaller than the density of the plurality of point-like light spots of the first diffraction pattern DP1. In the embodiment, the plurality of point-like light spots of the third diffraction pattern DP3 may be arranged in a matrix, and the point-like light spots of the first diffraction pattern DP1 may be arranged in a random number, and the disclosure is not limited thereto.

When the third diffraction pattern DP3 is a plurality of low-density point-like light spots with a small field of view (FOV), it is suitable for use in low-resolution sensing space and may reduce the amount of calculation required for stereoscopic space modeling. For example, it is used to sense the three-dimensional spatial information of a third test object OB3 which is farther away from the user, such as the size of the room it is located in, modeling of room furniture and furnishings, etc. Therefore, the projector 10 may be applied in more different fields. It is worth mentioning that in an embodiment not shown, the projector may only include the first light emitting area 101 and the second light emitting area 102. Correspondingly, the diffractive optical element 110 may only include the first diffraction structure 111 and the second diffraction structure 112 respectively overlapped with the first light emitting area 101 and the second light emitting area 102. In other embodiments, the projector may also include more light emitting areas and be correspondingly configured with more various diffraction structures, and the disclosure is not limited thereto.

On the other hand, the light blocking layer 120 is disposed between the first diffraction structure 111 and the second diffraction structure 112 and between the second diffraction structure 112 and the third diffraction structure 113. The light blocking layer 120 may include, but is not limited to, a dark-colored light-shielding material (such as black), a light-shielding material with high optical density (such as optical delnsity (OD) value >0.5), a light-shielding material with low transmittance (for example, a transmittance of less than or equal to 30%) for the first light beam L1, the second light beam L2, and the third light beam L3, or a light-shielding material with high absorption rate for the first light beam L1, the second light beam L2, and the third light beam L3. Through the arrangement of the light blocking layer 120, the proportion of the first light beam L1 irradiating the adjacent second diffraction structure 112 may be reduced, the proportion of the second light beam L2 irradiating the adjacent first diffraction structure 111 and the third diffraction structure 113 may be reduced, and the proportion of the third light beam L3 irradiating the adjacent second diffraction structure 112 may also be reduced. That is to say, the light blocking layer 120 may reduce the proportion of crosstalk between the first diffraction pattern DP1, the second diffraction pattern DP2, and the third diffraction pattern DP3 and reduce the generation of stray light, thereby further enhancing the clarity of structured light and the sensing sensitivity when applied in the sensing field.

In addition, the lens array 130 is disposed between the light source 100 and the diffractive optical element 110 for further converging the light beam emitted by the light source 100, so as to improve the light energy utilization efficiency of the light source 100 and the brightness of the generated diffraction pattern. Furthermore, the lens array 130 includes a first lens 131, a second lens 132, and a third lens 133. The first lens 131, the second lens 132, and the third lens 133 may all be condenser lenses. In the embodiment, the first lens 131 is disposed between the first light emitting area 101 and the first diffraction structure 111, the second lens 132 is disposed between the second light emitting area 102 and the second diffraction structure 112, and the third lens 133 is disposed between the third light emitting area 103 and the third diffraction structure 113. In addition, the refractive power of the first lens 131 may be smaller than the refractive power of the second lens 132, and the refractive power of the second lens 132 may be larger than the refractive power of the third lens 133.

Through the lenses with different light-focusing abilities of the lens array 130, the light beams emitted by the first light emitting area 101, the second light emitting area 102, and the third light emitting area 103 may be focused respectively, so that the light in different areas may be focused at the desired distance. For example, the refractive power of the third lens 133 may be the smallest. When used in long-distance sensing, the sharpness and clarity of the third diffraction pattern DP3 irradiating the third test object OB3 may be effectively improved. In other embodiments, if the light beam emitted by the light source 100 is highly parallel, the lens array 130 may be omitted to further reduce the volume, weight and cost of the projector, and the disclosure is not limited thereto.

On the other hand, the frame 140 may have an accommodation space such that the light source 100, the diffractive optical element 110, the light blocking layer 120, and the lens array 130 are disposed in the frame 140. The frame 140 may be made of a material with high absorption rate for the first light beam L1, the second light beam L2, and the third light beam L3, so as to further reduce the light leakage ratio of the light beam emitted by the light source 100 and improve the light energy utilization rate. In some embodiments, the frame 140 may have an opening (not shown) to allow the circuit pins of the light source 100 to extend out of the frame 140, so as to provide control signals or power signals required by the light source 100, and the disclosure is not limited thereto.

Figure 2C:
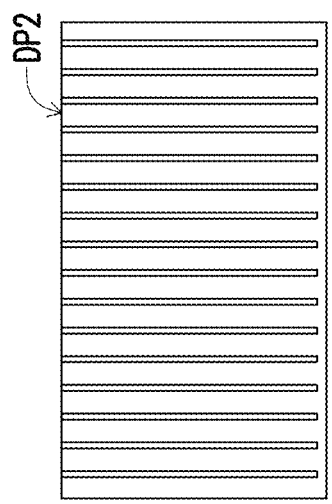
Figure 2C:
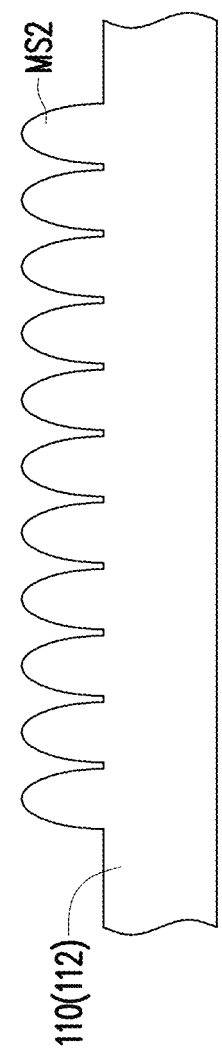

FIG. 2A to FIG. 2C are schematic diagrams of a diffractive optical element and its corresponding generated diffraction pattern according to an embodiment of the disclosure. Referring to FIG. 2A, the first diffraction structure 111 of the diffractive optical element 110 may include a plurality of first microstructures MS1 arranged with high density, whereby the corresponding first diffraction pattern DP1 (for example, a plurality of point-like light spots randomly distributed) may be generated when the first light beam L1 passes through the first diffraction structure 111. Or as shown in FIG. 2B, the third diffraction structure 113 of the diffractive optical element 110 may include a plurality of third microstructures MS3 arranged with low density, whereby the corresponding third diffraction pattern DP3 (for example, a plurality of point-like light spots arranged in a matrix) may be generated when the third light beam L3 passes through the third diffraction structure 113. Similarly, as shown in FIG. 2C, the second diffraction structure 112 of the diffractive optical element 110 may include a plurality of second microstructures MS2 arranged with low density, whereby the corresponding second diffraction pattern DP2 (for example, a plurality of striped light spots appearing in a regular arrangement) may be generated when the second light beam L2 passes through the second diffraction structure 112. Accordingly, different diffraction structures may be used in different sensing fields to generate different diffraction patterns, thereby improving the versatility of the projector 10.

Figure 3A:
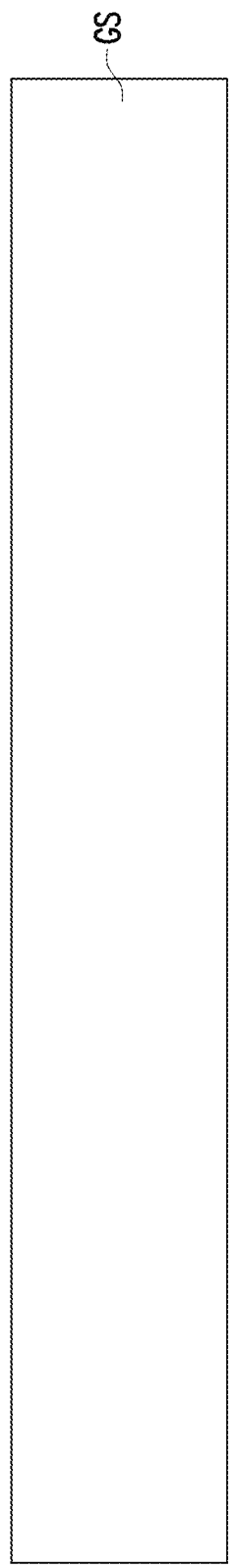
FIG. 3A to FIG. 3H are schematic diagrams of a manufacturing process of a diffractive optical element and a light blocking layer according to an embodiment of the disclosure.
Figure 3B:
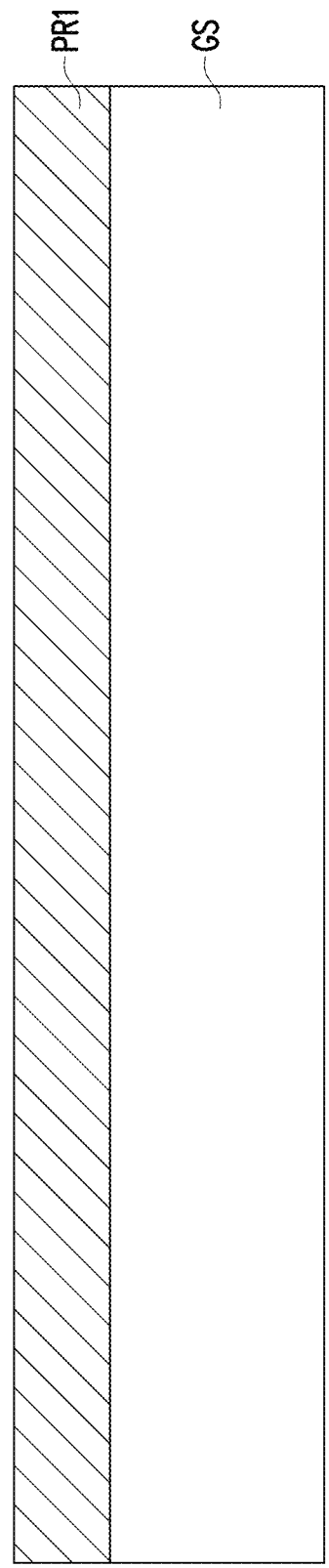

FIG. 3A to FIG. 3H are schematic diagrams of a manufacturing process of a diffractive optical element and a light blocking layer according to an embodiment of the disclosure. Referring first to FIG. 3A and FIG. 3B, the method of manufacturing the diffractive optical element 110 is, for example, a photolithography process. For example, a substrate GS (such as a glass substrate, but not limited thereto) is first provided, and a first photoresist PR1 is coated on the substrate GS. The method of applying the first photoresist PR1 is, for example, spin coating, but the disclosure is not limited thereto.

Figure 3C:
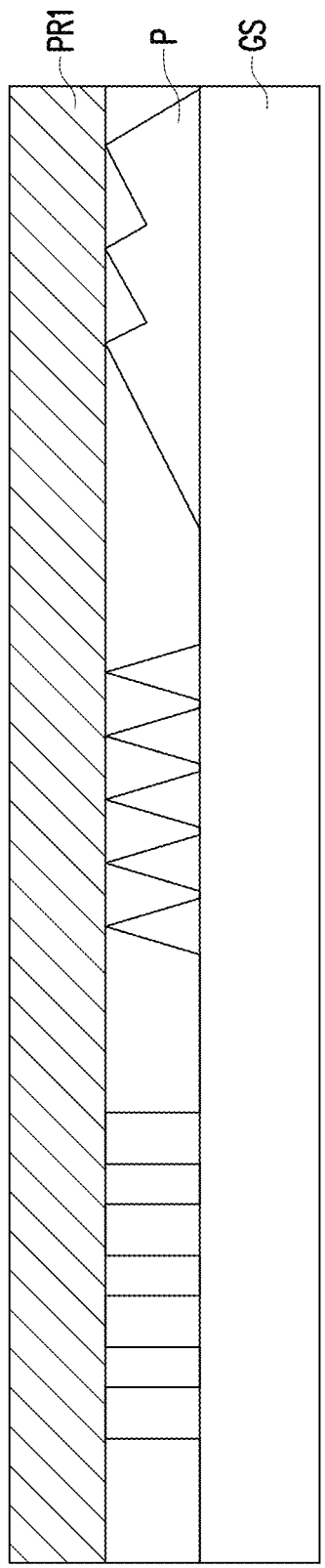
Figure 3D:
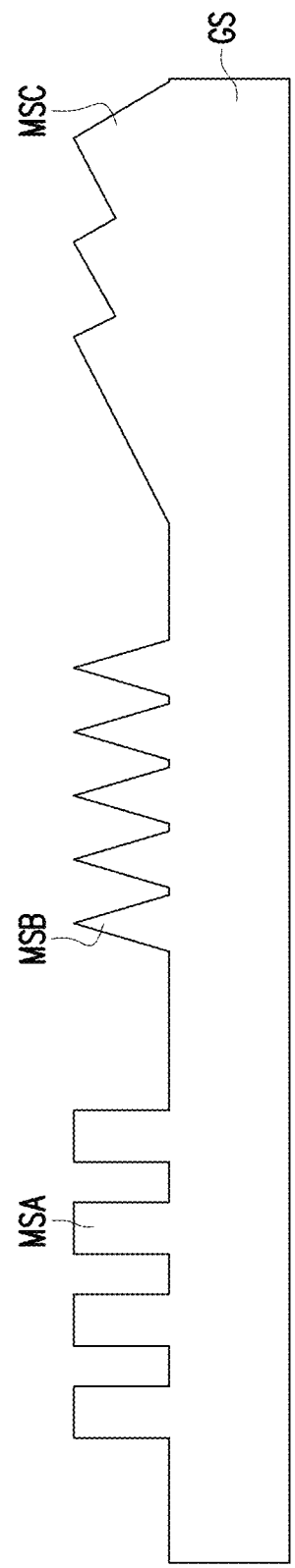

Next, referring to FIG. 3C to FIG. 3D, the coated first photoresist PR1 is first exposed to generate a pattern P to be formed on the substrate GS. Then, the development process and the etching process are used to make the corresponding pattern P into a microstructure MSA, a microstructure MSB, and a microstructure MSC. For example, the microstructure MSA, the microstructure MSB, and the microstructure MSC may respectively correspond to the first diffraction structure 111, the second diffraction structure 112, and the third diffraction structure 113 of the above embodiment, and the disclosure is not limited thereto.

Figure 3E:
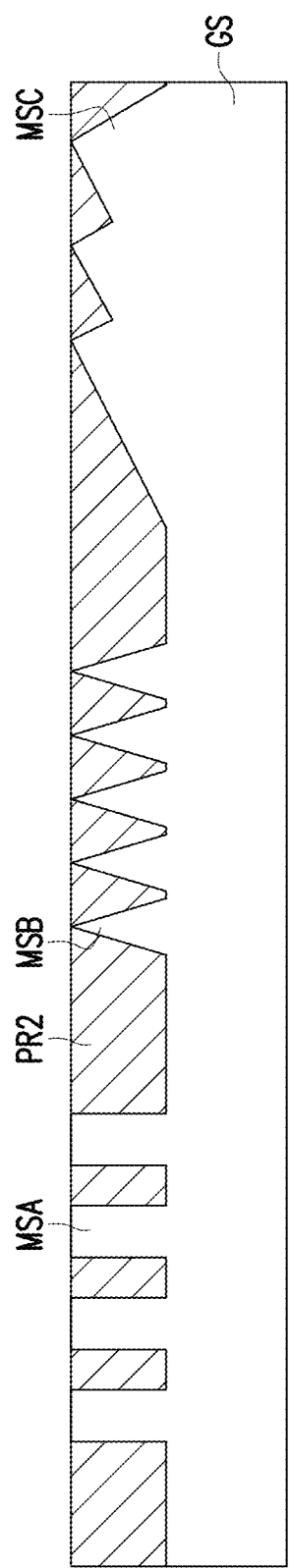
Figure 3F:
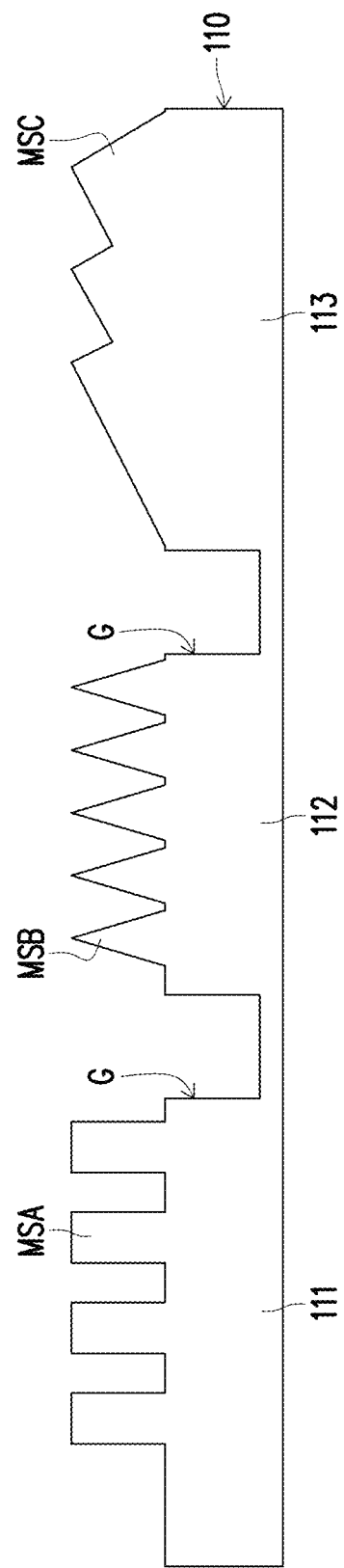

Next, referring to FIG. 3E to FIG. 3F, a second photoresist PR2 is coated on the microstructure MSA, the microstructure MSB, and the microstructure MSC. The method of applying the second photoresist PR2 may be the same as or different from the method of applying the first photoresist PR1, and the disclosure is not limited thereto. Then, as shown in FIG. 3F, the second photoresist PR2 is subjected to the development process and the etching process to form grooves G between the microstructure MSA, the microstructure MSB, and the microstructure MSC. At this time, the production of the diffractive optical element 110 is initially completed, and the first diffraction structure 111, the second diffraction structure 112 and the third diffraction structure 113 are defined.

Figure 3G:
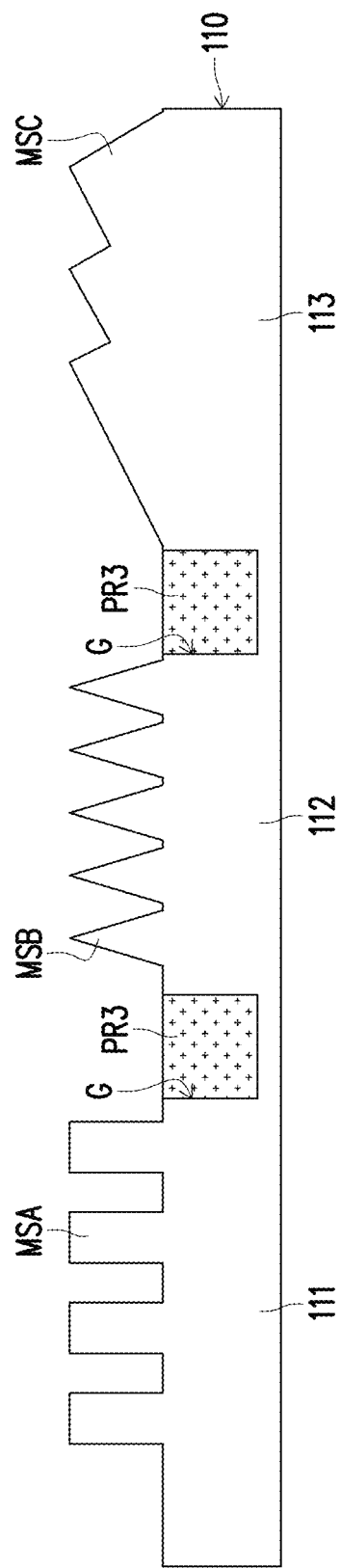
Figure 3H:
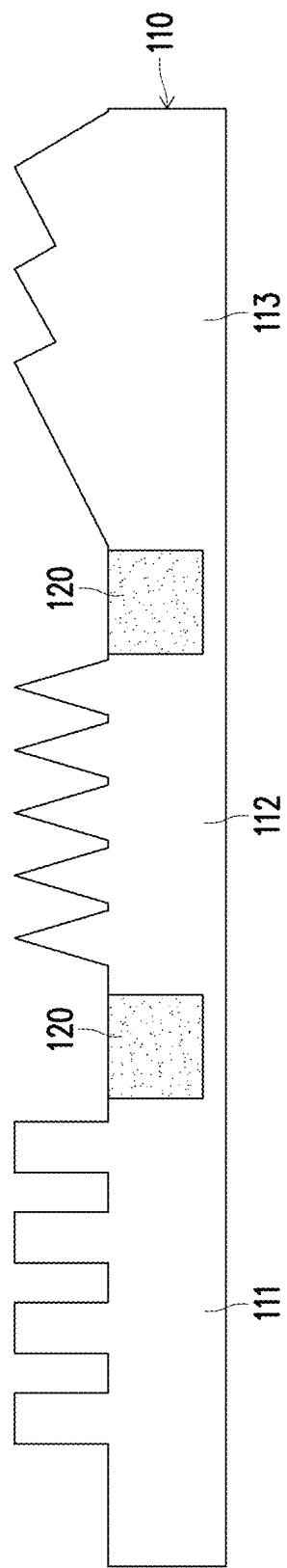

Continuing to refer to FIG. 3G to FIG. 3H, the third photoresist PR3 may be coated into the groove G, and the exposure process and the development process are performed on the third photoresist PR3. Finally, the third photoresist PR3 may be used to form the light blocking layer 120, so as to complete the arrangement of the light blocking layer 120.

Figure 4:
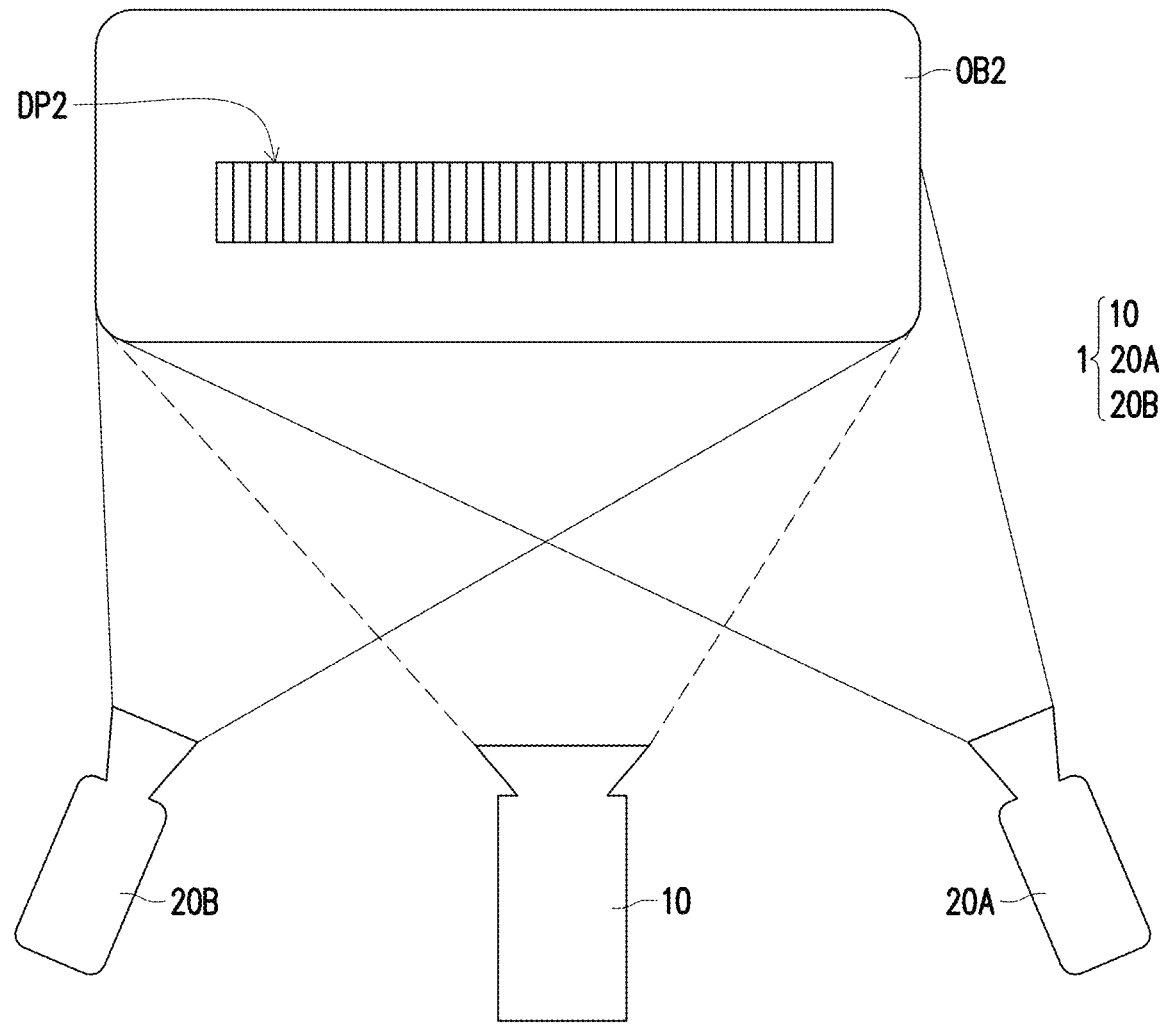
FIG. 4 is a schematic structural diagram of a sensing system and a schematic diagram of a generated diffraction pattern according to an embodiment of the disclosure.

FIG. 4 is a schematic structural diagram of a sensing system and a schematic diagram of a generated diffraction pattern according to an embodiment of the disclosure. Referring to FIG. 4, a sensing system 1 may be used to sense three-dimensional information (such as depth, surface profile, or three-dimensional coordinates) of the test object. The sensing system 1 may include the above projector 10, a first camera 20A, and a second camera 20B. When the structured light (the second diffraction pattern DP2 shown in FIG. 4) emitted by the projector 10 irradiates the test object (for example, the second test object OB2 shown in FIG. 4), the reflected light beam may be sensed by the first camera 20A and the second camera 20B, and the optical sensors (not shown) in the first camera 20A and the second camera 20B may convert the received light signals into electrical signal. The sensing system 1 may also include a solid-state processor (not shown) that may receive the electrical signal to determine the three-dimensional information of the second test object OB2. The solid-state processor includes, for example, a microcontroller unit (MCU), a central processing unit (CPU), a microprocessor, a digital signal processor (DSP), a programmable controller, a programmable logic device (PLD), or other similar device, or a combination thereof, and the disclosure is not limited thereto. In addition, in an embodiment, various functions of the solid-state processor may be implemented as a plurality of program codes. These codes will be stored in a memory and executed by the solid-state processor. Alternatively, in some embodiments, the various functions of the solid-state processor may be implemented as one or more circuits. The disclosure is not limited to using software or hardware to implement the various functions of the solid-state processor.

And as mentioned before, the projector 10 is provided with a plurality of light emitting areas to correspondingly emit different diffraction patterns (the first diffraction pattern DP1, the second diffraction pattern DP2, and the third diffraction pattern DP3 as shown in FIG. 1), the solid-state processor may also control the projector 10 to generate different diffraction patterns according to different sensing distances or application scenarios, greatly improving the versatility of the sensing system 1. Also, when the sensing system 1 is applied to a near-eye display device (such as augmented reality (AR), virtual reality (VR), and mixed reality (MR)) to perform triangulation positioning and depth calculations, the center position of the near-eye display device is where the first camera 20A and the second camera 20B have the highest coverage, and therefore usually cover the most optical elements. If the projector is split into a plurality of units, it will affect the coverage of the camera's depth calculation and increase the computational burden of the solid-state processor. Correspondingly, since the sensing system 1 of the disclosure may generate different diffraction patterns with a single projector 10, it may be disposed in the center of the near-eye display device and achieve optimal spatial coverage, thereby enhancing the performance of the near-eye display device while effectively reducing the product weight, volume and cost.

To sum up, in the projector and sensing system of the disclosure, the diffractive optical element (DOE) includes optical diffraction structures of different patterns. When light beams emitted by the same light source pass through the optical diffraction structures of different patterns, different diffraction patterns may be generated. Different diffraction patterns may be suitable for sensing different distances. Therefore, the disclosure may generate a variety of diffraction patterns with a single projector. Compared with an architecture in which a plurality of projectors generate a plurality of diffraction patterns, the disclosure may effectively reduce costs and conserve device space; further, customized optical diffraction structures may be tailored for different sensing distances (for example, the test object is the user's face or fingers, the test object is the environment around the user, the test object is the space where the user is, etc.), which may greatly improve the modeling accuracy of the sensing system.

Furthermore, when projectors or sensing systems are used in near-eye display devices (such as augmented reality (AR), virtual reality (VR), and mixed reality (MR)) to perform triangulation positioning and depth calculations, the center position of the device is where the two cameras have the highest coverage, and therefore usually covers the most optical elements. If the projector is split into a plurality of units, it will affect the coverage of the camera's depth calculation and greatly increase the amount of calculations required by the solid-state processor (central processing unit, CPU) in the sensing system. On the contrary, since the projector or sensing system of the disclosure may generate various diffraction patterns with a single projector, it may be applied to various sensing spaces and may achieve the optimal spatial coverage, which improves the performance of near-eye display devices, facilitates lightweighting, and greatly improves the competitiveness of products.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A projector, comprising:
   a light source, having a first light emitting area and a second light emitting area;
   a diffractive optical element, disposed on the light source, wherein the diffractive optical element has a first diffraction structure and a second diffraction structure respectively overlapped with the first light emitting area and the second light emitting area, and the first diffraction structure is different from the second diffraction structure; and
   a light blocking layer, disposed between the first diffraction structure and the second diffraction structure.

2. The projector according to claim 1, further comprising a lens array, disposed between the light source and the diffractive optical element.

3. The projector according to claim 2, wherein the lens array comprises a first lens and a second lens, the first lens and the second lens are both condenser lenses,
   the first lens is disposed between the first light emitting area and the first diffraction structure, the second lens is disposed between the second light emitting area and the second diffraction structure, and a refractive power of the first lens is greater than a refractive power of the second lens.

4. The projector according to claim 1, further comprising a frame, wherein the light source and the diffractive optical element are disposed in the frame.

5. The projector according to claim 1, wherein a wavelength range of a light beam emitted by the light source comprises at least one of a visible light band and an infrared light band.

6. The projector according to claim 1, wherein a light beam emitted by the light source forms a first diffraction pattern after passing through the first diffraction structure, the light beam forms a second diffraction pattern after passing through the second diffraction structure,
   the first diffraction pattern comprises a plurality of point-like light spots, and the second diffraction pattern comprises a plurality of striped light spots.

7. The projector according to claim 6, wherein the light source further comprises a third light emitting area, the diffractive optical element further comprises a third diffraction structure overlapped with the third light emitting area, and the first diffraction structure, the second diffraction structure, and the third diffraction structure are all different.

8. The projector according to claim 7, wherein the light beam emitted by the light source forms a third diffraction pattern after passing through the third diffraction structure, the third diffraction pattern comprises a plurality of point-like light spots, and a density of the plurality of point-like light spots of the third diffraction pattern is smaller than a density of the plurality of point-like light spots of the first diffraction pattern.

9. The projector according to claim 1, wherein the light source comprises at least one of a point-like vertical-cavity surface-emitting laser, a linear vertical-cavity surface-emitting laser, an edge-emitting laser, and a random point vertical-cavity surface-emitting laser.

10. A sensing system for sensing three-dimensional information of a test object, the sensing system comprising:
    a projector, the projector comprising:
       a light source, having a first light emitting area and a second light emitting area for emitting a light beam to irradiate the test object;
       a diffractive optical element, disposed on the light source, wherein the diffractive optical element has a first diffraction structure and a second diffraction structure respectively overlapped with the first light emitting area and the second light emitting area, and the first diffraction structure is different from the second diffraction structure; and
       a light blocking layer, disposed between the first diffraction structure and the second diffraction structure; and
    a camera, configured to receive the light beam reflected by the test object.

11. The sensing system according to claim 10, further comprising a lens array, disposed between the light source and the diffractive optical element.

12. The sensing system according to claim 11, wherein the lens array comprises a first lens and a second lens, the first lens and the second lens are both condenser lenses,
    the first lens is disposed between the first light emitting area and the first diffraction structure, the second lens is disposed between the second light emitting area and the second diffraction structure, and a refractive power of the first lens is greater than a refractive power of the second lens.

13. The sensing system according to claim 10, further comprising a frame, wherein the light source and the diffractive optical element are disposed in the frame.

14. The sensing system according to claim 10, wherein a wavelength range of a light beam emitted by the light source comprises at least one of a visible light band and an infrared light band.

15. The sensing system according to claim 10, wherein the light beam forms a first diffraction pattern after passing through the first diffraction structure, the light beam forms a second diffraction pattern after passing through the second diffraction structure,
    the first diffraction pattern comprises a plurality of point-like light spots, and the second diffraction pattern comprises a plurality of striped light spots.

16. The sensing system according to claim 15, wherein the light source further comprises a third light emitting area, the diffractive optical element further comprises a third diffraction structure overlapped with the third light emitting area, and the first diffraction structure, the second diffraction structure, and the third diffraction structure are all different.

17. The sensing system according to claim 16, wherein the light beam forms a third diffraction pattern after passing through the third diffraction structure, the third diffraction pattern comprises a plurality of point-like light spots, and a density of the plurality of point-like light spots of the third diffraction pattern is smaller than a density of the plurality of point-like light spots of the first diffraction pattern.

18. The sensing system according to claim 10, wherein the light source comprises at least one of a point-like vertical-cavity surface-emitting laser, a linear vertical-cavity surface-emitting laser, an edge-emitting laser, and a random point vertical-cavity surface-emitting laser.

* * * * *